United States Patent
Norlund et al.

(10) Patent No.: US 8,498,652 B2
(45) Date of Patent: Jul. 30, 2013

(54) METHOD AND ARRANGEMENT RELATING TO POWER CONSUMPTION IN A COMMUNICATIONS NETWORK

(75) Inventors: Krister Norlund, Gothenburg (SE); Magnus Johansson, Gothenburg (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 111 days.

(21) Appl. No.: 13/142,652

(22) PCT Filed: Dec. 30, 2008

(86) PCT No.: PCT/EP2008/011140
§ 371 (c)(1), (2), (4) Date: Jun. 29, 2011

(87) PCT Pub. No.: WO2010/075866
PCT Pub. Date: Jul. 8, 2010

(65) Prior Publication Data
US 2011/0275395 A1   Nov. 10, 2011

(51) Int. Cl.
*H04W 72/00* (2009.01)

(52) U.S. Cl.
USPC ......... 455/452.2; 455/561; 455/450; 370/329

(58) Field of Classification Search
USPC ..... 455/450–454, 561; 343.2, 343.4; 370/329
See application file for complete search history.

(56) References Cited

U.S. PATENT DOCUMENTS

| | | | |
|---|---|---|---|
| 7,940,721 B2* | 5/2011 | Bachl et al. | 370/329 |
| 2002/0177446 A1 | 11/2002 | Bugeja et al. | |
| 2004/0120290 A1 | 6/2004 | Makhijani et al. | |
| 2006/0072503 A1* | 4/2006 | Kim et al. | 370/329 |
| 2008/0062948 A1 | 3/2008 | Ponnuswamy | |
| 2009/0028104 A1* | 1/2009 | Jung | 370/329 |
| 2010/0214966 A1* | 8/2010 | Hu et al. | 370/311 |

FOREIGN PATENT DOCUMENTS

| WO | 01/18987 A1 | 3/2001 |
|---|---|---|
| WO | 2009/034089 A1 | 3/2009 |

* cited by examiner

*Primary Examiner* — Christian Hannon
(74) *Attorney, Agent, or Firm* — Rothwell, Figg, Ernst & Manbeck, P.C.

(57) ABSTRACT

The present invention relates to a method and an infrastructure arrangement for controlling power consumption of at least one User Equipment (UE) (320a-320c) in a wireless communications network (300) by initially scheduling said at least one UE and increasing power efficiency for said at least one UE (320a).

12 Claims, 5 Drawing Sheets

METHOD AND ARRANGEMENT RELATING TO POWER CONSUMPTION IN A COMMUNICATIONS NETWORK

CROSS REFERENCE TO RELATED APPLICATION(S)

This application is a 35 U.S.C. §371 National Phase Entry Application from PCT/EP2008/011140, filed Dec. 30, 2008, designating the United States, the disclosure of which is incorporated herein in its entirety by reference.

TECHNICAL FIELD

The present invention relates to a method and arrangement for controlling power consumption of User Equipments in a wireless communications network.

BACKGROUND

3GPP LTE (Long Term Evolution) is a radio access technology for packet-switched services. It is characterized by lack of dedicated channels, and all data in downlink and uplink is transmitted in shared channels. This means that each user (UE, User Equipment) needs to be scheduled in time and frequency in order to be able to receive and transmit data.

The physical layer is based on OFDM (Orthogonal Frequency Division Multiplexing) in both downlink and uplink. One OFDM symbol consists of a number of subcarriers in the frequency domain, depending on the channel bandwidth. One subcarrier in one OFDM symbol can carry one modulation symbol. For data, one UE is always allocated a number of subcarriers in a number of subsequent OFDM symbols.

The scheduling node in LTE is eNodeB (evolved Node B), also called RBS (Radio Base Station).

In uplink, a number of physical channels and physical signals are defined:
  PUSCH (Physical uplink shared channel)
    This channel carries data and control, and is shared between all UEs in the cell.
  PUCCH (Physical uplink control channel)
    This channel carries control only and is UE-specific.
  PRACH (Physical random access channel)
    This channel is used by UEs that are not synchronized and which need to access the eNodeB.
  Demodulation reference signals
    These are UE-specific reference signals (pilots) associated with PUSCH or PUCCH, used by eNodeB for channel estimation of PUSCH or PUCCH.
  Sounding reference signals
    These are UE-specific reference signals (pilots) not associated with PUSCH or PUCCH, used by eNodeB for a wideband frequency selective estimate of the channel.

The uplink carrier can be viewed as a resource grid with OFDM symbols (also called SC-FDMA symbols, where SC-FDMA is an acronym of Single Carrier Frequency Division Multiple Access and is used to emphasize that all subcarriers used by one UE need to be adjacent) in the time domain and subcarriers in the frequency domain. One RE (resource element) is defined as one OFDM symbol times one subcarrier and can be used to carry one modulation symbol.

Figure 1:
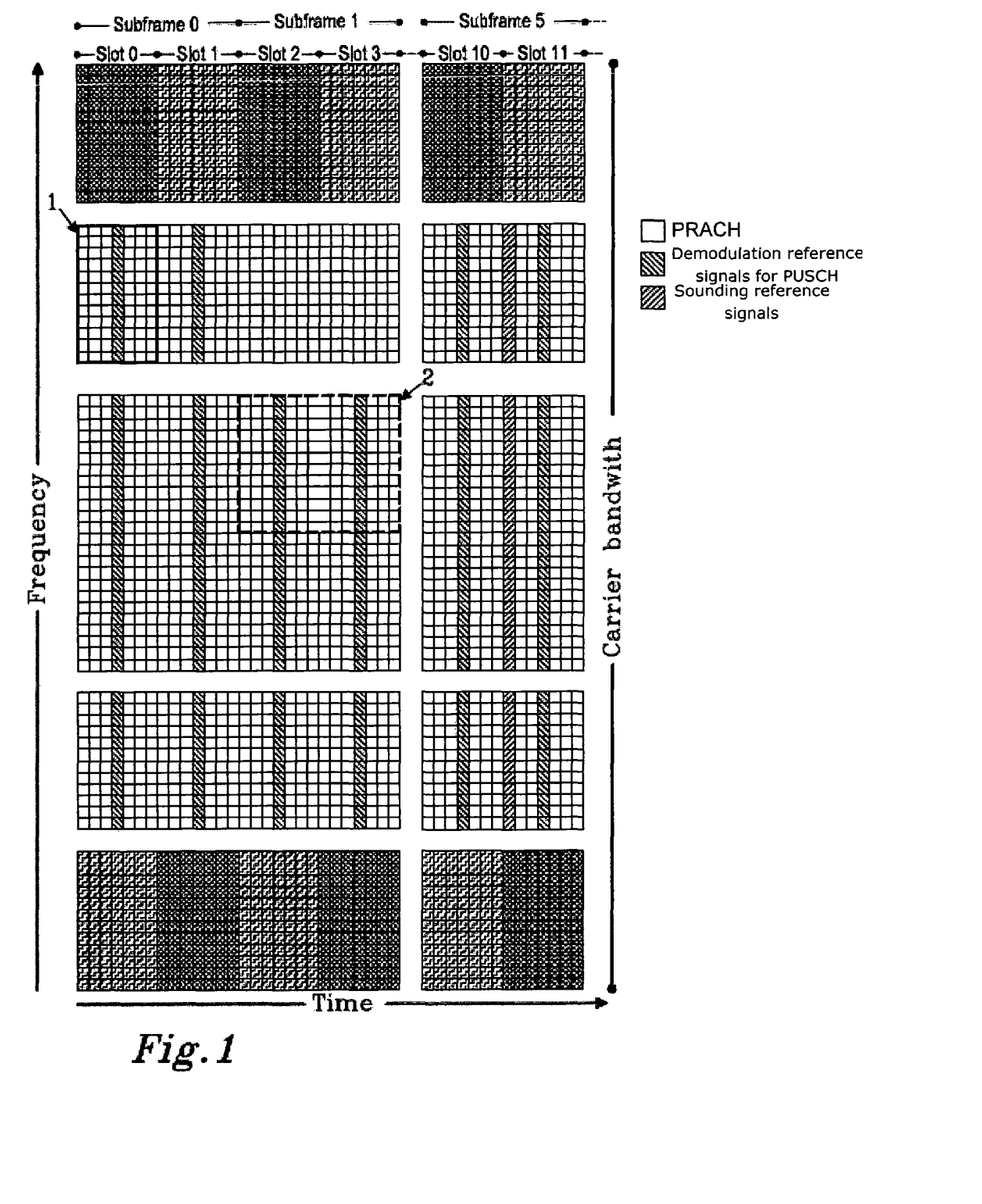
FIG. 1 illustrates a conventional uplink resource grid.

The conventional uplink resource grid is illustrated in FIG. 1.

The solid thick rectangle 1 in FIG. 1 denotes an RB (resource block), and the dashed thick rectangle 2 denotes an SB (scheduling block). The size of an RB is one slot (0.5 ms) times 12 subcarriers. RBs can be allocated to either of PUSCH (including demodulation reference signals), PUCCH (including demodulation reference signals) or PRACH. An exception is sounding reference signals that occupy one OFDM symbol in some slots, thus reducing the number of REs for PUSCH.

In FIG. 1, solid empty square denotes PUSCH, left dashed square denote demodulation reference signals for PUSCH, right dashed square denote sounding reference signals and solid gray square denote PRACH. This is just an example of allocating RBs to channels.

It is the task of the uplink scheduler in the RBS to allocate PUSCH SBs to different UEs. It is also a task of the uplink scheduler to select modulation scheme and coding rate per UE. This is of course LTE-specific. In the general case, the scheduler allocates resources per UE, where resources could be frequency, antennas, codes or maybe something else.

The uplink scheduler needs to take (amongst others) the following into account when performing scheduling:
  The number of UEs possible to multiplex in the same subframe is limited due to control channel resources in the downlink.
  The UEs may have limited amount of data in their transmission buffers. It is a waste to allocate a larger transmission bandwidth than corresponds to the amount of data in the buffer.
  The UEs may have a limited capability in terms of amount of data per subframe, limited by the UE category.
  The UE has a limited amount of power. The power control mechanism typically strives for keeping the received SINR (signal-to-interference and noise ratio) in the RBS at a constant value. However, when the UE is far from the RBS, or when the path loss is large due to other reasons (in-building penetration loss, shadowing or small-scale fading), the UE power capability may not be enough to keep this target SINR. This also depends on the transmission bandwidth since SINR is proportional to the PSD (power spectral density), which is power per resource unit rather than proportional to the power.
  The transmission is spectral efficient if D/B Number of transmitted bits/bandwidth used for transmission, is maximized. The transmission is power efficient if D/E, Number of transmitted bits/energy used for transmission, is maximized. Wherein:
D=number of transmitted bits
B=bandwidth used for transmission or transmission bandwidth (Hz)
E=energy used for transmission Spectral efficiency and power efficiency are in conflict with each other. That is since either increased bandwidth or increased energy can be used in order to transmit a certain number of bits.

The upper limit of a channel capacity for an additive white Gaussian noise channel can be calculated according to Shannon's formula:

$$C = B * \log_2(1 + P/(N_0 * B))$$

where
  C: channel capacity (bits/s)
  B: transmission bandwidth (Hz)
  P: transmission power (W)
  $N_0$: noise spectral density (W/Hz)

It can be seen from the above formula that bandwidth is a more valuable resource than power, since P is inside the logarithmic expression.

In reality, C is limited by the modulation schemes and coding rates supported in the applicable standard, in this example LTE release 8. The most spectral efficient Modulation Coding Scheme (MCS) is given by the highest modulation order and highest coding rate, depending on the implementation of the optional 64QAM capability. It should be noted that LTE release 8 is given as an example and later LTE releases may implement other modulations and code rates.

The most power efficient modulation scheme in LTE release 8 is QPSK. It can be understood that it is more power efficient than 16QAM since the distance between the symbols in the constellation diagram is longer for the same average power. The most efficient coding rate is ⅓ since that is the mother code rate of the Turbo codec. More robust coding can be used by applying repetition, but that does not increase the power efficiency.

The existing straightforward uplink scheduling method, e.g. LTE release 8, comprises the steps of:

List the UEs in priority order. This priority order could be decided by any method and include any criteria such as channel quality, fairness, subscription priority etc.

Decide which UEs to schedule in the current subframe, depending on the amount of available downlink control channel resources.

For each UE, try to schedule as much data as possible. That is, let the data size be limited by the amount of data in buffer, UE capability, UE power or number of remaining SBs.

Optionally, the uplink scheduler can divide the total number of SBs between the selected UEs in the first step, and then adapt the amount of data per UE according to this pre-selected transmission bandwidth.

Select the transport format (modulation scheme and coding rate) so that the quality requirements are met with as little margin as possible, in order to be spectral efficient.

Thus, the straightforward approach has a number of problems:

If the UE becomes power limited, this is that it needs to reduce the power spectral density if the transmission bandwidth is increased, then the spectral efficiency decreases if more SBs are added, even if this means that more data can be scheduled.

By using the most efficient transport format, UE power consumption is not optimized in cases when not all transmission bandwidth is utilized.

SUMMARY

The present invention solves at least some of the above mentioned problems.

Other advantages of the invention may include maximizing data rate at high load and the power consumption is kept low at low load. The present invention may also allow an operator to offer an energy-saving alternative, e.g. to environmental-aware subscribers. The invention may also increase the power source active time (talk time) for the energy-saving UEs.

For these reasons a method is provided for controlling power consumption of at least one User Equipment, i.e. UE, in a wireless communications network. The method comprises the steps of: initially scheduling said at least one UE and increasing power efficiency for said at least one UE. Thus, the method makes it possible to provide spectral efficiency at high load and energy saving at low load.

The initial scheduling is performed at same time as link adoption and/or power control. The initial scheduling may comprise one or several of frequency resource allocation, antenna resource allocation or code resource allocation. In one embodiment the at least one UE has power saving properties.

According to one embodiment the method further comprises:
a. selecting one or several UEs scheduled for an uplink,
b. computing a maximum spectral efficiency-optimized bandwidth, i.e. BW resource, $BW_{SEopt}$ and a corresponding data size, $TBS_{SEopt}$, for each UE,
c. computing a maximized data size for each UE,
d. if BW left, dividing remaining BWs between UEs in such a way that a total power consumption is minimized, and
e. for each power-saving UE using a most power-efficient Modulation Coding Scheme, i.e. MCS, and keep the amount of data as in said corresponding data size ($TBS_{SEopt}$).

The method may further comprise assigning a minimum bandwidth, BW, resource to a number of UEs. In order to avoid starving an already selected UE, each UE may be guaranteed at least a minimum BW resource. In one embodiment in the step b, for each UE, a most efficient MCS supported by a base station is selected and based on channel characteristics and UE power capability, a maximum BW resource size is calculated and a maximum BW resource size is decided by the amount of data in the UE's transmit buffer or by the UE's maximum throughput capability. In one embodiment in said step c, a sum of $BW_{SEopt}$ for all UEs is compared to a total BW resource. In said step d, the division of the total BW resource is made in such a way that all UEs use a most efficient MCS.

The invention also relates to a device for use in a communications network. The device comprises at least one processing unit, at least one memory unit, a user interface unit, at least one communication interface and a power source. The processing unit is configured to control the throughput and/or to decrease the energy consumption of the device.

To allow a novel type of device for user with demands on the energy efficiency, the device may comprising subscriber preferences depending on a device type, said subscriber preference defining said device as one of a: throughput-maximizing or energy-saving type. There may also be defined with preferences depending on a device type, said preference defining said device as one of a: throughput-maximizing or energy-saving type, said preferences being stored in a database in the a core network or made by user manually as a configuration at connection setup or at a time the user wants to change the setting.

The invention also relates to an infrastructure arrangement for use in a communications network comprising at least one processing unit, at least one memory unit and at least one communication interface. The arrangement is configured to select a number of communication devices for scheduling based on a number of available control channels and communication device priorities. The processing unit is configured to initially schedule at least one communication device and signal said device to increase power efficiency. The processing unit may further be configured to calculate a maximum spectral efficiency-optimized resource and a corresponding data size for each communication device, and select an efficient Modulation Coding Scheme, MCS, supported by a base station.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

The present invention is applicable for wireless systems in general having ability for uplink shared channels with scheduling in time and in some more domains such as frequency, codes or antenna streams.

One basic idea of the invention is to give a user a possibility to be power efficient. Another basic idea of the invention is to provide spectral efficiency at high load and energy-saving at low load for a communication device.

This invention is related to channels with the following characteristics (PUSCH in LTE release 8 is given as one illustrative example):
  It is shared between multiple UEs.
  Each UE gets a transmission band which is a number of SBs. The SBs for one UE need to be adjacent in frequency. This is applicable for LTE release 8. Other resources than SBs (frequency) could be applicable for other systems, such as antennas or codes.
  Power control is used for each UE. This means that the transmitted power as well as received power in RBS differs between UEs.
  Link adaptation is used for each UE. This means that the modulation scheme and code rate is set per UE.

It should though be noted that the term "spectral efficiency" as used the description is applicable if the resources is frequency.

Figure 2:
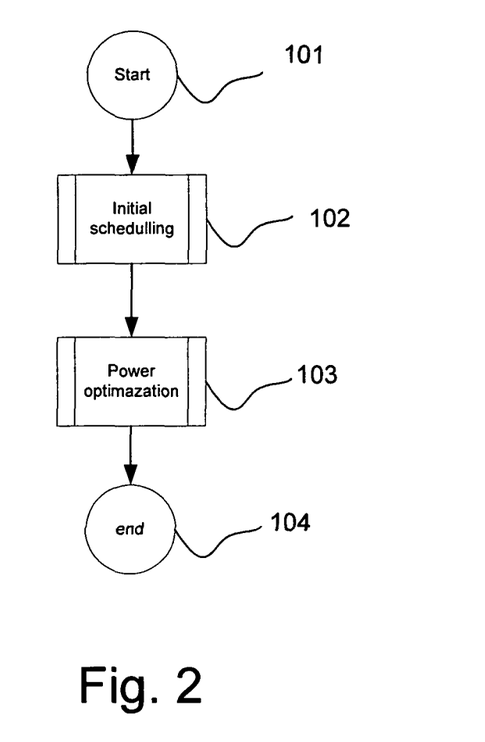
FIG. 2 illustrates schematically in a flow diagram a general method according to the present invention.

FIG. 2 illustrates the general steps of the invention according to a general embodiment.
  101: Start,
  102: Carry out one or several of: initial scheduling, link adoption or power control,
  103: Power optimize for power saving terminals,
  104: End.

In step 102 the initial scheduling may comprise one or several of frequency, antenna and/or code resource allocations.

Figure 3:
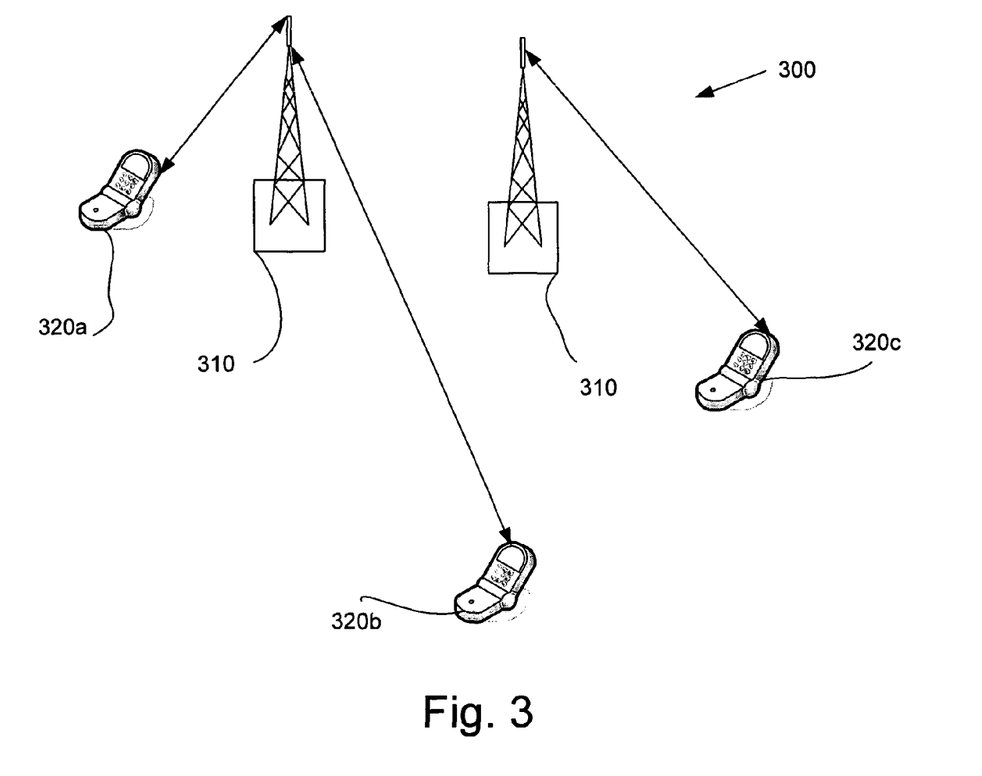
FIG. 3 illustrates schematically a network according to the present invention.

FIG. 3 illustrates schematically a wireless communications network 300 comprising a number of base stations 310 (eNode B) and UEs 320a-320c. Each UE 320 communicates with one or several base stations.

Firstly, the UEs 320 are scheduled in such a way that the total throughput is maximized. This is achieved if the number of bits/Hz is maximized, that is the spectral efficiency is optimized.

Secondly, if there is bandwidth left, the energy consumption is decreased by using the bandwidth less efficiently and thus trade power against (unused) spectrum.

Furthermore, UEs 320 can be divided into two categories depending on subscriber preferences:
  Throughput-maximizing UE 320a and 320b: option to get as high throughput as possible.
  Energy-saving UE 320c: option e.g. for environmental-aware subscribers, will use lower power consumption at the cost of slight lower throughput. The active time (talk time) for the battery is higher for energy-saving UEs than non energy-saving UEs.

The UE category may typically be fetched from the subscriber's profile and enforced by the base station (eNodeB) uplink scheduler.

Figure 6:
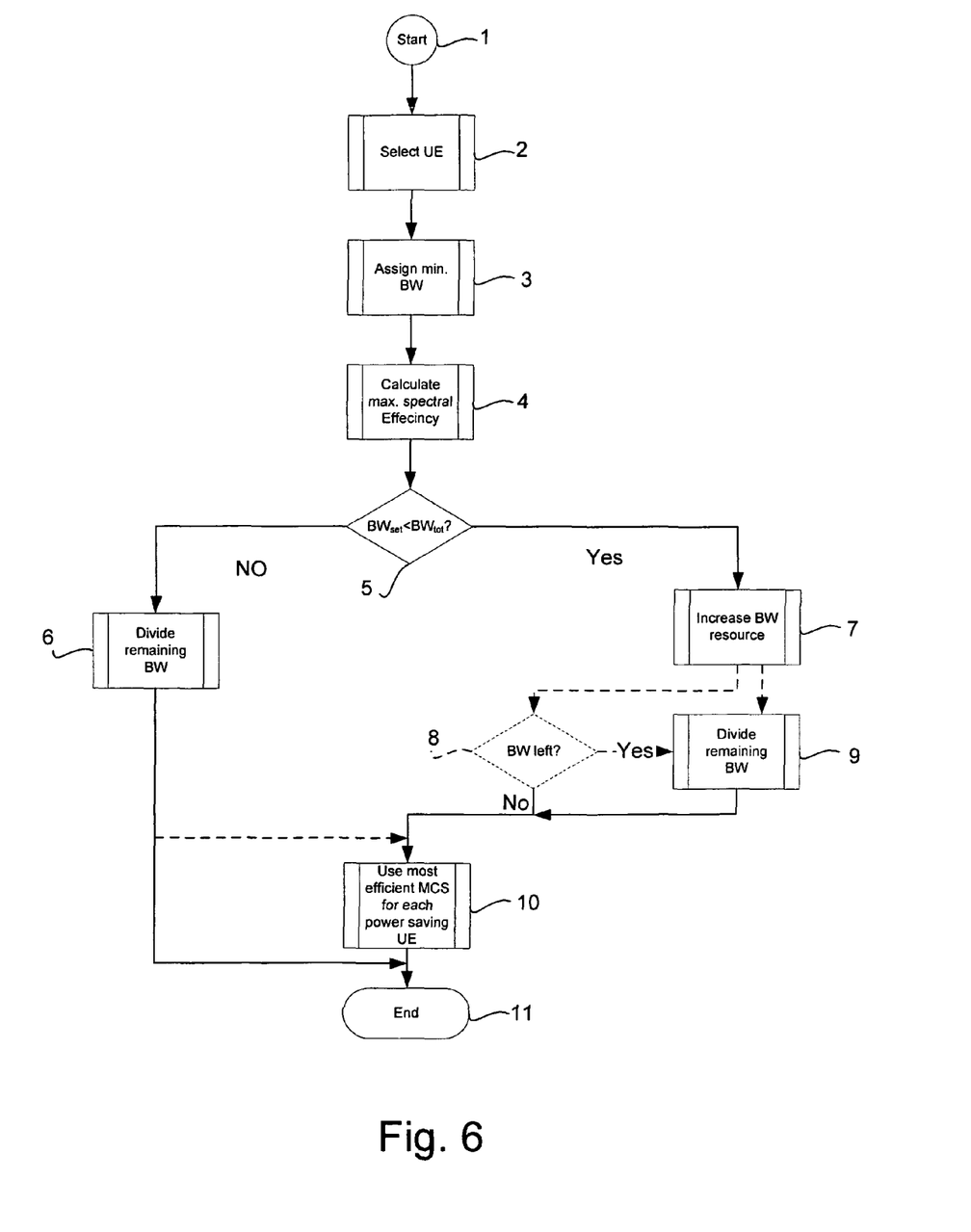
FIG. 6 illustrates schematically in a flow diagram a more detailed method according to the present invention.

The flow diagram of FIG. 6 illustrates steps for spectral efficiency and power saving scheduling according to one example of the invention:
  1. Start:
    The execution starts when it is time to schedule UEs for an uplink subframe.
  2. Select UEs to schedule in this subframe:
    A number of UEs are selected for scheduling, based on e.g. number of available control channels and UE priorities.
  3. Assign a minimum Band Width (BW) resource to each UE:
    In order not to starve an already selected UE, each UE is guaranteed at least a minimum BW resource (typically one SB)
  4. Calculate the maximum spectral efficiency-optimized BW resource $BW_{SEopt}$ and the corresponding data size $TBS_{SEopt}$ for each UE:
    For each UE, the most efficient MCS supported by eNB is selected, e.g. 16QAM-9/10. Based on the channel characteristics and UE power capability, the maximum BW resource size is calculated.
    The maximum BW resource size does not necessarily be decided by the UE maximum power, but possibly by the amount of data in the UE's transmit buffer or by the UE's maximum throughput capability. The resulting data size (transport block size, TBS) is denoted $TBS_{SEopt}$.
  5. Sum of $BW_{SEopt}$<total BW resource?
    The sum of $BW_{SEopt}$ for all UEs is compared to the total BW resource.
  6. Divide the total BW resource between the UEs in some fair way, keeping $BW<=BW_{SEopt}$ for each UE:
    If the sum of $BW_{SEopt}>=$total BW resource, it means that all UEs can transmit with the most efficient MCS. The total BW resource is divided between the UEs in some fair way which is out of the scope for this invention. However the division of the total BW resource must be made in such a way that all UEs still can use the most efficient MCS.
    After this step, scheduling is finished for this subframe.
  7. Increase the BW resource for each UE to $BW_{TPopt}$ in such a way that the possible total data size ($\Sigma TBS_{TPopt}$) is maximized:
    The remaining BW resource is divided between the UEs that has more data to transmit. The division is made in such a way that the total throughput is maximized. When an UE gets more BW, it can use it to transmit more bits even if the spectral efficiency goes down due to a less efficient MCS. However, given the most robust coding and modulation, the SINR should never be below a certain SINRmin. This will is some cases limit the maximum BW a power limited UE can be assigned. It could be noted that UEs reaching their limits on amount of data in buffer or throughput capability do not get any advantage of more BW. Instead the BW allocations should be increased for UEs with more data in their buffers. Due to limited amount of data in buffer or throughput capability, it is possible that there is unused bandwidth left after this step.
  8. Is there BW left?
    It is checked if there is any BW left after step 7

9. Divide the remaining BW between UEs in such a way that the total power consumption is minimized:
   If there is BW left, it is divided between the UEs in such a way that the total power consumption is minimized. The purpose of this step is to make sure that the UEs are energy efficient at low load.
10. For each power-saving UE: use the most power-efficient MCS and keep the amount of data as $TBS_{SEopt}$:
    UEs belonging to the power-saving category shall not use the increased BW to send more bits. The number of bits was decided in step 4 as $TBS_{SEopt}$. Instead a more robust MCS shall be selected, which makes it possible to use less power to transmit the same number of bits. This means that UEs that belong to the energy-saving category are more energy efficient at a relatively small cost of spectral efficiency.
11. End: The execution ends.

Step 8 could be a part of step 9. In step 9 could be a special case if there is zero bandwidth left to distribute. In a more general case, step 6 should continue to step 10.

Figure 7:
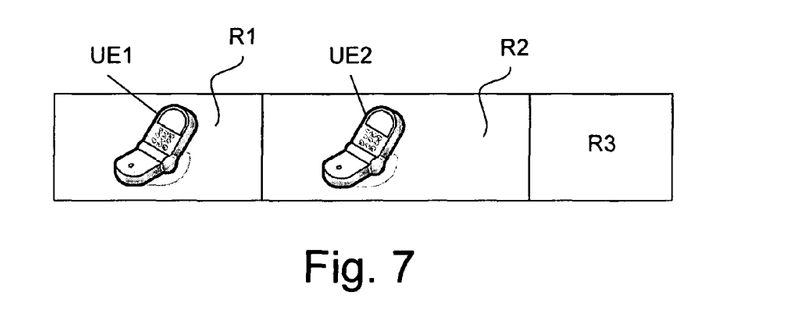
FIG. 7 illustrates schematically resource sharing scheme according to the present invention.

FIG. 7 illustrates, in a simple way, the teachings of the invention. The two UEs, UE1 and UE2, are assigned resources realized by the blocks R1 and R2. According to the invention, if there is resource left, such as bandwidth, R3, the energy consumption is decreased by using the bandwidth less efficiently and thus trade power against (unused) spectrum.

Figure 4:
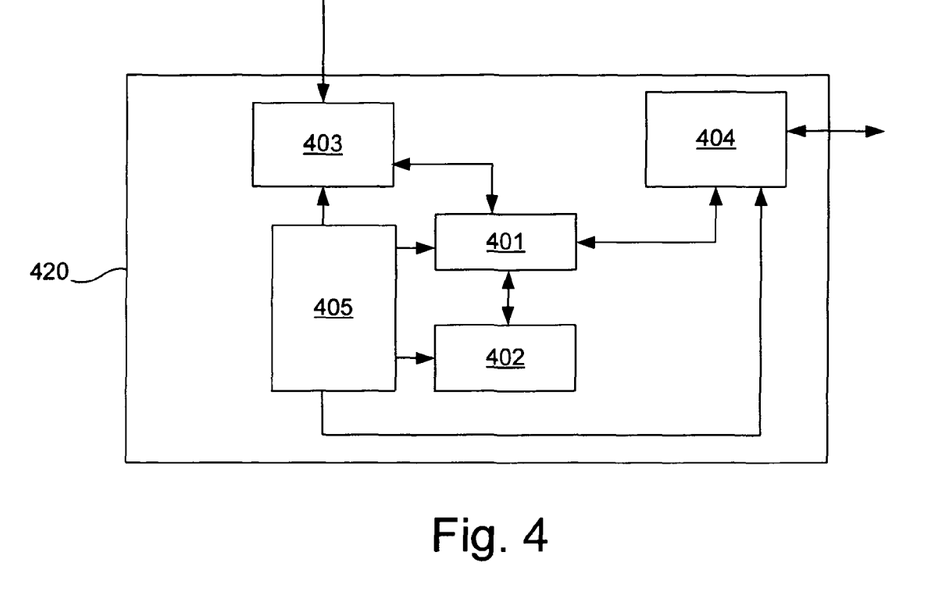
FIG. 4 illustrates schematically a device implemented according to the present invention.

FIG. 4 illustrates a device 420 (user equipment) UE implementing the solution according to the present invention is shown. The device may comprise at least one processing unit 401, at least one memory unit 402, a user interface unit 404 and at least one communication interface 403. The processing unit is arranged to run software or hardware code for communication control and data traffic. The processing unit 401 may comprise a microprocessor, an ASIC (application Specific Integrated Circuit), a Digital signal processor (DSP), an FPGA (Field programmable gate array), or any other suitable type of processing unit capable of running software or hardware instructions. The memory unit 402 may comprise any suitable type of memory (volatile and/or non-volatile) such as e.g. RAM, ROM, EEPROM, Flash, and hard disk. The communication interface 403 connects the device 402 to the infrastructure network 100. It should be understood by the skilled person that other communication equipment may be present as well depending on the type of wireless communication protocol/standard used. A power source 405, e.g. a battery, is arranged to supply the electrical circuits with electrical power.

The processing unit 401 is configured to control the throughput and/or to decrease the energy consumption if there is bandwidth left.

The memory unit 402 may further store subscriber preferences depending on the device type. The preferences may include: throughput-maximizing, i.e. option to get as high throughput as possible or energy-saving, i.e. option to use lower power consumption at the cost of slightly lower throughput. The active time (talk time) for the battery in the latter case may be higher for energy-saving devices than non energy-saving devices.

It should be noted that the information about the default wishes of the user could also be stored in a database in the Core Network. Another option is that the user may manually make a configuration at connection setup or whenever the user wants to change this setting.

Figure 5:
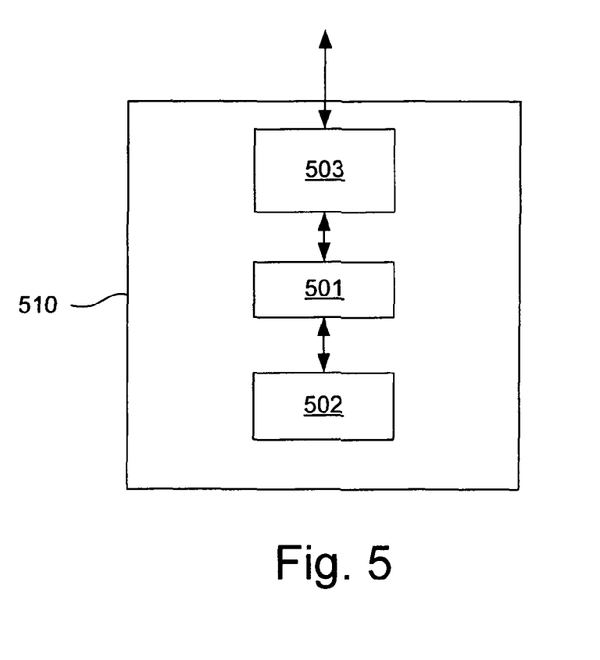
FIG. 5 illustrates schematically a base station according to the present invention.

FIG. 5 illustrates an arrangement 510 in the base station implementing the solution according to the present invention is shown. The arrangement may comprise at least one processing unit 501, at least one memory unit 502 and at least one communication interface 503. The processing unit is arranged to run software or hardware code for communication control and data traffic. The processing unit 501 may comprise a microprocessor, an ASIC (application Specific Integrated Circuit), a Digital signal processor (DSP), an FPGA (Field programmable gate array), or any other suitable type of processing unit capable of running software or hardware instructions. The memory unit 402 may comprise any suitable type of memory (volatile and/or non-volatile) such as e.g. RAM, ROM, EEPROM, Flash, and hard disk. The communication interface 503 connects to the infrastructure network 100. It should be understood by the skilled person that other communication equipment may be present as well depending on the type of wireless communication protocol/standard used. The arrangement may be implemented freestanding in the communication path, as a part of the base station logic or incorporated into the base station as an instruction sets.

The arrangement 510 selects a number of UEs for scheduling, based on a number of available control channels and UE priorities. The number of available control channels and UE priorities can be acquired from the network or stored in the memory unit 502. Then, each UE may be guaranteed at least a minimum BW resource.

The processing unit 501 calculates the maximum spectral efficiency-optimized BW ($BW_{SEopt}$) resource and a corresponding data size for each UE, and selects the most efficient MCS supported by eNB. The processing unit calculates the sum of $BW_{SEopt}$ for all UEs and compares it to the total BW resource. The total BW resource is divided by the arrangement between the UEs. The processing unit is configured to schedule BW resource (assign a minimum bandwidth) for each UE to $BW_{TPopt}$ in such a way that the possible total data size is maximized. The remaining BW resource is then divided between the UEs that may have more data to transmit. The division is made in such a way that the total throughput is maximized.

Then the processing unit checks if there is any BW left and the remaining BW is divided between UEs in such a way that the total power consumption is minimized.

If UEs belonging to a power-saving category are detected, the arrangement 510 will not allow to use the increased BW to send more bits; instead a more robust MCS is selected, which makes it possible to use less power to transmit the same number of bits.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method for controlling power consumption of a number of user equipments in a wireless communications network comprising a base station, the method comprising the steps of:
   initially scheduling at least one user equipment (UE);
   selecting a plurality of UEs scheduled for an uplink;

computing a maximum spectral efficiency-optimized bandwidth ($BW_{SEopt}$) and a corresponding data size ($TBS_{SEopt}$) for each selected UE;

computing a maximized data size for each selected UE, and dividing any remaining bandwidth between the selected UEs in such a way that total power consumption is minimized.

2. The method of claim 1, wherein said at least one UE has power saving properties, and the method further comprises the step of:

using, for each power-saving UE, a most power-efficient modulation coding scheme supported by the base station, and limiting a total amount of data from the UE to said corresponding data size ($TBS_{SEopt}$).

3. The method of claim 1, further comprising assigning a minimum bandwidth resource to a number of UEs.

4. The method of claim 3, wherein each selected UE is guaranteed at least a minimum bandwidth resource.

5. The method of claim 1, wherein the step of computing the maximum spectral efficiency-optimized bandwidth ($BW_{SEopt}$) and the corresponding data size ($TBS_{SEopt}$) for each selected UE comprises: (i) selecting a most efficient modulation coding scheme supported by the base station and (ii) calculating a maximum bandwidth resource size based on channel characteristics and user equipment power capability, based on an amount of data in the UE's transmit buffer, or based on the UE's maximum throughput capability.

6. The method of claim 1, wherein the step of computing the maximized data size for each selected UE comprises comparing a sum of $BW_{SEopt}$ for all UEs to a total bandwidth resource.

7. The method of claim 1, wherein the step of dividing any remaining bandwidth is made in such a way that all selected UEs use a most efficient modulation coding scheme supported by the base station.

8. An infrastructure arrangement for use in a communications network comprising:
at least one processing unit;
at least one memory unit; and
at least one communication interface, wherein
the arrangement is configured to
select one or more user equipments (UEs) scheduled for an uplink;
compute a maximum spectral efficiency-optimized bandwidth ($BW_{SEopt}$) and a corresponding data size ($TBS_{SEopt}$) for each selected UE;
compute a maximized data size for each selected UE; and
divide any remaining bandwidth between the UEs in such a way that total power consumption is minimized.

9. The infrastructure arrangement according to claim 8, wherein at least one of the selected UEs has power saving properties, and the infrastructure is further configured to:

use, for each power-saving UE, a most power-efficient modulation coding scheme supported by the infrastructure arrangement, and
limit a total amount of data from the UE to said corresponding data size ($TBS_{SEopt}$).

10. The method of claim 1, wherein the computing the maximum spectral efficiency-optimized bandwidth ($BW_{SEopt}$) for each selected UE is based on using a most spectrally efficient modulation coding scheme for the UE, based on channel characteristics, and based on power capability of the UE.

11. The method of claim 10, wherein the computing the maximized data size comprises increasing, in response to a determination that a sum of $BW_{SEopt}$ of all of the selected UEs is less than a total bandwidth resource, allocation of bandwidth resource to each of the selected UEs having an amount of transmission data that exceeds $TBS_{SEopt}$, and wherein the remaining bandwidth comprises bandwidth of the total bandwidth resource that is left after the increased allocation of bandwidth resource.

12. The method of claim 11, wherein the dividing any remaining bandwidth between the selected UEs comprises selecting, for each of the selected UEs, a modulation coding scheme that is less spectrally efficient than the most spectrally efficient modulation coding scheme.

* * * * *

UNITED STATES PATENT AND TRADEMARK OFFICE
CERTIFICATE OF CORRECTION

Page 1 of 3

PATENT NO. : 8,498,652 B2
APPLICATION NO. : 13/142652
DATED : July 30, 2013
INVENTOR(S) : Norlund et al.

It is certified that error appears in the above-identified patent and that said Letters Patent is hereby corrected as shown below:

The title page showing the illustrative figure should be deleted to be replaced with the attached title page.

In the Drawings:

In Fig. 1, Sheet 1 of 5, delete "Carrier bandwith" and insert -- Carrier bandwidth --, therefor.

In Fig. 2, Sheet 2 of 5, for Tag "102", delete "Initial schedulling" and insert -- Initial scheduling --, therefor.

In Fig. 2, Sheet 2 of 5, for Tag "103", delete "Power optimazation" and insert -- Power optimization --, therefor.

In the drawing sheet, consisting of Fig. 6, should be deleted to be replaced with the drawing sheet, consisting of Fig. 6, as shown on the attached pages.

In the Specifications:

In Column 4, Line 5, delete "$BW_{SEopt}$" and insert -- $BW_{SEopt,}$ --, therefor.

In Column 5, Line 10, delete "invention;" and insert -- invention. --, therefor.

In the Claims:

In Column 10, Line 2, in Claim 8, delete "configured to" and insert -- configured to: --, therefor.

Signed and Sealed this
Sixth Day of May, 2014

Michelle K. Lee
*Deputy Director of the United States Patent and Trademark Office*

(12) United States Patent
Norlund et al.

(10) Patent No.: US 8,498,652 B2
(45) Date of Patent: Jul. 30, 2013

(54) METHOD AND ARRANGEMENT RELATING TO POWER CONSUMPTION IN A COMMUNICATIONS NETWORK

(75) Inventors: Krister Norlund, Gothenburg (SE); Magnus Johansson, Gothenburg (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 111 days.

(21) Appl. No.: 13/142,652

(22) PCT Filed: Dec. 30, 2008

(86) PCT No.: PCT/EP2008/011140
§ 371 (c)(1),
(2), (4) Date: Jun. 29, 2011

(87) PCT Pub. No.: WO2010/075866
PCT Pub. Date: Jul. 8, 2010

(65) Prior Publication Data
US 2011/0275395 A1  Nov. 10, 2011

(51) Int. Cl.
*H04W 72/00* (2009.01)

(52) U.S. Cl.
USPC ......... 455/452.2; 455/561; 455/450; 370/329

(58) Field of Classification Search
USPC ..... 455/450–454, 561, 343.2, 343.4; 370/329
See application file for complete search history.

(56) References Cited

U.S. PATENT DOCUMENTS

| | | | |
|---|---|---|---|
| 7,940,721 B2* | 5/2011 | Bachl et al. | 370/329 |
| 2002/0177446 A1 | 11/2002 | Bugeja et al. | |
| 2004/0120290 A1 | 6/2004 | Makhijani et al. | |
| 2006/0072503 A1* | 4/2006 | Kim et al. | 370/329 |
| 2008/0062948 A1 | 3/2008 | Ponnuswamy | |
| 2009/0028104 A1* | 1/2009 | Jung | 370/329 |
| 2010/0214966 A1* | 8/2010 | Hu et al. | 370/311 |

FOREIGN PATENT DOCUMENTS

| | | |
|---|---|---|
| WO | 01/18987 A1 | 3/2001 |
| WO | 2009/034089 A1 | 3/2009 |

* cited by examiner

*Primary Examiner* — Christian Hannon
(74) *Attorney, Agent, or Firm* — Rothwell, Figg, Ernst & Manbeck, P.C.

(57) ABSTRACT

The present invention relates to a method and an infrastructure arrangement for controlling power consumption of at least one User Equipment (UE) (320a-320c) in a wireless communications network (300) by initially scheduling said at least one UE and increasing power efficiency for said at least one UE (320a).

12 Claims, 5 Drawing Sheets

Fig. 6